United States Patent Office 3,704,255
Patented Nov. 28, 1972

3,704,255
POLYESTERS
Robert A. Braun, Rochester, N.Y., assignor to E. I. du Pont de Nemours and Company, Wilmington, Del.
No Drawing. Continuation-in-part of abandoned application Ser. No. 776,824, Nov. 18, 1968. This application Mar. 3, 1971, Ser. No. 120,775
Int. Cl. C07c 69/76; C08g 17/02
U.S. Cl. 260—404.8
5 Claims

ABSTRACT OF THE DISCLOSURE

The polymers of this invention are made by first reacting an anhydride with a polyol, and then reacting the product with a hydroxyl terminated polyester. The polymers are useful as film-formers in coating compositions.

CROSS-REFERENCE TO RELATED APPLICATIONS

This application is a continuation-in-part of application Ser. No. 776,824, filed Nov. 18, 1968 now abandoned.

STATEMENT OF THE INVENTION

This invention relates to polyesters. It is more particularly directed to polyesters represented by the structures (1)

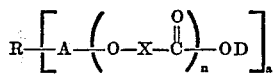

and (2)

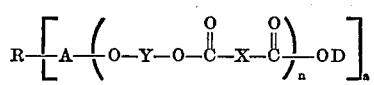

where

R can be the residue from a polyhydroxy compound;
A can be

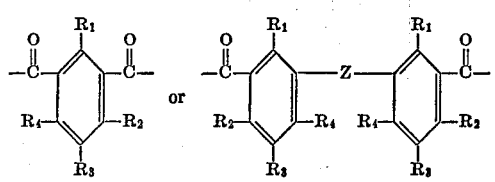

where
$R_1$, $R_2$, $R_3$ and $R_4$ can be hydrogen or —COOH
Z can be

—$CH_2$—, —S—, —O—, or —$SO_2$—;

X can be phenylene or an alkylene radical of 2 through 18 carbon atoms;
Y can be an alkylene radical of 2 through 18 carbon atoms;
D can be phenyl or a straight- or branched chain alkyl radical of 1 through 18 carbon atoms;
$a$ can be a number 2 through 6; and
$n$ can be a number 10 through 500.

UTILITY

The polymers of the invention are useful as film-formers in coating compositions, particularly when combined with a second polymer having complementary reactive groups. Illustrative of such second polymers are heat reactive phenolics, polyglycidyl ethers and esters, polyisocyanate resins, butylated urea/formaldehyde resins and melamine/formaldehyde/alkanol resins.

The polymers of the invention can be used as film-formers by mixing from about 55 to about 95 parts of the polymer with from about 5 to 45 parts of the second complementary polymer, in a suitable solvent. This solution can then be used directly to give clear coatings or it may be pigmented as desired.

The coating composition can be applied conventionally and preferably is then baked for from about 10 to 30 minutes at 80–200° C.

The polymers of the invention are also useful as aids for dispersing solid particles in organic liquids. They are especially useful as aids for dispersing pigments in organic liquids. Illustrative of the pigments which can be dispersed are titanium dioxide, carbon black, zinc oxide, lead titanate, potassium titanate, antimony oxide, lithopone, phthalocyanine blue, toluidine red, quinacridone and the like.

Pigment dispersions made with polymers of the invention are remarkably resistant to flocculation, which gives the paints into which the dispersions are incorporated higher initial gloss, better hiding and tinting strength, and makes them resistant to color drift and gloss loss. These pigment dispersions can also be used satisfactorily with many more diverse types of paints than conventional pigment dispersions. Moreover, a dispersion made with a polymer of the invention has a significantly higher pigment content, while retaining the same degree of fluidity, than when conventional aids are used.

The polymers of the invention can be used as pigment dispersing aids by dissolving from 0.001 to about 2.00 grams of polymer per square meter [1] of surface of the pigment to be used, preferably 0.004 to about 0.100 gram per square meter, in an organic liquid compatible with the paint into which the pigment dispersion is to be incorporated. Illustrative of organic liquids which can be used are aliphatic and aromatic hydrocarbons, ethers, esters, ketones, alcohols and mixtures of these.

An appropriate amount of pigment is then added to this solution, which is then subjected to shear, as by sand-grinding or ball-milling, to deagglomerate and disperse the pigment. This pigment dispersion or mill-base is then added directly to a paint.

Polymers of the invention preferred for use as pigment dispersing aids are those of formulas where R is

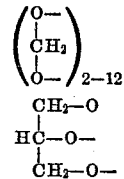

---

[1] Measured by the Brunauer, Emmett and Teller nitrogen adsorption method described on page 30 of "Colloidal Dispersions" by Earl K. Fischer, published by John Wiley and Sons in 1950.

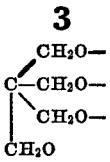

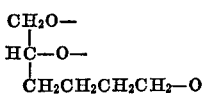

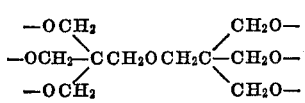

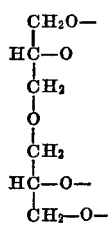

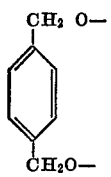

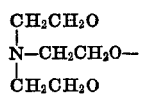

or

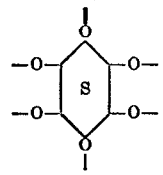

Especially preferred are those polymers whose preparation is shown in Examples 3, 4 and 5.

The polymers of the invention are also useful for dispersing magnetic oxides such as iron oxide or chromium dioxide in compositions used to prepare magnetic tape. Use of 0.5–10%, by weight of such a composition, of a polymer of the invention promotes wetting of the oxide, improves adhesion of the composition to the tape substrate and improves the tape's magnetic properties.

PREPARATION OF THE POLYMERS

The polymers of this invention are made by first reacting an anhydride with a polyol, and then reacting the product with a hydroxyl terminated polyester.

Illustrative of anhydrides and polyols which can be used are

- trimellitic anhydride
- benzophenone dianhydride
- methylene diphthalic anhydride
- thiodiphthalic anhydride
- oxydiphthalic anhydride
- pyromellitic dianhydride
- ethylene glycol
- hexamethylene glycol
- glycerol
- pentaerythritol
- hexanetriol
- dipentaerythritol
- diglycerol
- 1,4-bishydroxymethyl benzene
- triethanolamine
- hexahydroxycyclohexane The anyhydride and polyol are reacted by bringing together one anhydride molecule for each hydroxyl group on the polyol and heating the reaction mass at 120–150° C. for 2–5 hours. Ethylene glycol dimethyl ether can serve as a solvent if this is necessary.

The product is then reacted with a hydroxyl terminated polyester made by (1) Polymerizing a lactone such as propiolactone, caprolactone or pivalolactone.

(2) Condensing a glycol and a dibasic acid in the presence of a mono-alcohol. The formation of polyesters capped at both ends with hydroxyl groups should be minimized. This can be done by controlling the stoichiometry of the reaction so that the acid number and the hydroxyl number of the polyester are approximately equal.

(3) Condensing a hydroxy acid in the presence of a small amount of mono-alcohol.

Illustrative of these reactions are (1) 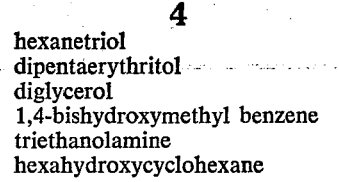

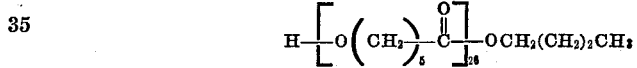

(2) 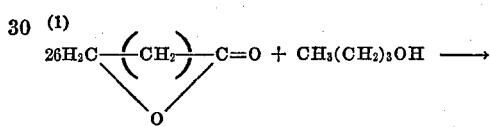

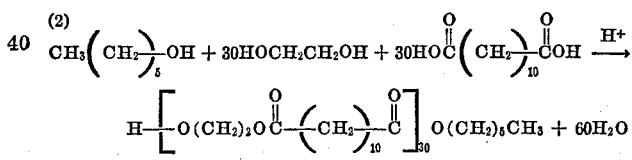

(3) 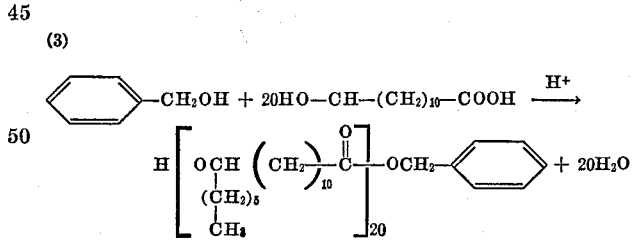

These reactions are described in greater detail in "Preparative Methods of Polymer Chemistry," Sorenson and Campbell, Interscience Publishers, Inc., New York, N.Y. (1961), pp. 111–127 and 242–247 and "Polyesters and Their Applications," Bjorksten Research Laboratories, Inc., Reinhold Publishing Corp., New York, N.Y. (1956).

One mole of a polyester thus prepared for each anhydride group on the anhydride-polyol product is then reacted with that product at 120–150° C. for from 2 to 5 hours.

The resulting polymer of the invention can be isolated by stripping the solvent from the resulting solution at 100° C., at a pressure of 20 mm.

The physical properties of the polymers of the invention thus prepared range from viscous liquid to friable solid. They are soluble in common organic liquids such as toluene, ethyl acetate, tetrahydrofuran, acetone, and dimethylformamide.

EXAMPLES

The following examples are submitted so that the invention may be more readily understood and practiced.

Those skilled in the art will no doubt be able to compose numerous variations on their central theme, such as the attachment of innocuous substituents. It is naturally considered that these variations are a part of the invention.

In the examples all parts are by weight unless otherwise indicated.

Example 1

A mixture of pyromellitic dianhydride (43.6 parts), ethylene glycol (6.6 parts) and anhydrous Cellosolve acetate (320 parts), was heated under nitrogen for three hours.

Exactly one-half of the product was heated with 296 parts of a hydroxyl terminated polycaprolactone (molecular weight 2960) and 300 parts of Cellosolve acetate for 15 hours under nitrogen at 120° C. The solvent was then removed by stripping at 100° C. and 20 mm. of pressure to give a white waxy solid having the structure

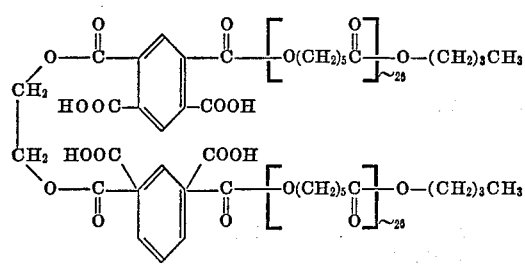

Example 2

A mixture of benzophenone dianhydride (64.4 parts), ethylene glycol (6.6 parts), and anhydrous Cellosolve acetate (320 parts) was heated at 120° C. for 4 hours. The solution was cooled and 7.5 parts of insoluble unreacted dianhydride were collected by filtration.

One-quarter of the filtrate was mixed with 130 parts of hydroxyl terminated polycaprolactone (molecular weight 2960) in 200 parts Cellosolve acetate and heated at 120° C. for 15 hours. The resulting clear solution was stripped at 100° C. and 20 mm. of pressure to give a waxy white solid having the structure

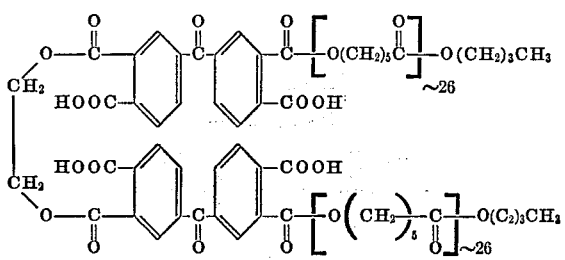

Example 3

A solution of 50.7 parts of triethanolamine in 150 parts of methylethyl ketone was added to a slurry of 218 parts of pyromellitic dianhydride in 500 parts of methylethyl ketone. This mixture was heated at 40° C. for 3 hours and then cooled to room temperature. The resulting solid was filtered off and dried under nitrogen.

Sixteen parts of the resulting product were mixed with 150 parts of Cellosolve acetate, added to 534 parts of a hydroxyl terminated polycaprolactone (molecular weight 2960) and heated under nitrogen for three hours at 120° C.

Solvent was removed by stripping at 100° C. and 20 mm. of pressure. The product was a homogeneous waxy solid having the structure

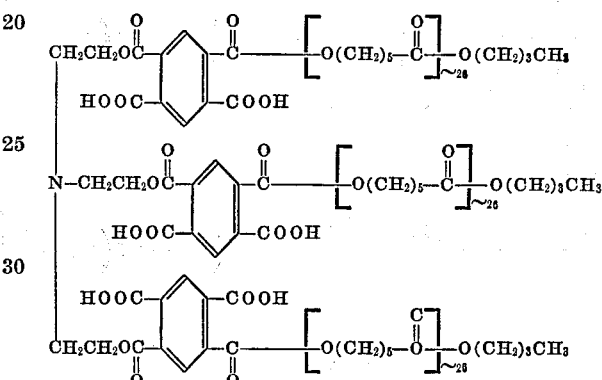

Example 4

(A) A mixture of oxydiphthalic anhydride (18.7 parts), dipentaerythritol (2.5 parts) and anhydrous ethylene glycol dimethyl ether (200 parts) was heated at 150° C. for three hours and then cooled to room temperature.

(B) One hundred sixty parts of 12-hydroxystearic acid, 7.8 parts of 2-ethylhexyl alcohol, 10 parts of xylene and 1 part of p-toluene sulfonic acid were charged to a reactor. The reaction mixture was heated at reflux and xylene distilled off until the flask contents reached 175° C. The mixture was then refluxed at 175° C. for 8 hours, with water being removed as it formed.

The mixture was then cooled to about 100° C. and all of the product of (A) added. After heating the mixture for six hours at 100° C., the mixture was freed of solvent by heating it at 100° C. and 20 mm. of pressure for one hour.

The product was a sticky resin having the structure

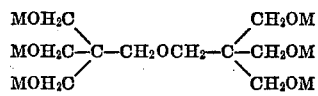

where M is

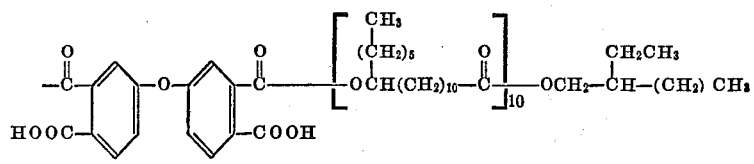

Example 5

(A) A mixture of methylene diphthalic anhydride (6.2 parts), 1,4-bis(hydroxymethyl) benzene (1.30 parts) and anhydrous ethylene glycol dimethyl ether (100 parts) was heated at 150° C. for three hours and then cooled to room temperature.

(B) Hexamethylene glycol (47.2 parts), sebacic acid (80.8 parts), n-hexyl alcohol (2 parts), xylene (10 parts) and p-toluene sulfonic acid (1 part) were charged to a vessel. The reaction mixture was heated at reflux and xylene distilled off until the temperature reached 150° C.

The mixture was then heated for 10 hours at 150° C. After cooling to 100° C., all of the product of A was added and the mixture heated six hours at 100° C. The solvent was removed at 100° C. and 20 mm. of pressure.

The resulting soft sticky solid had the structure

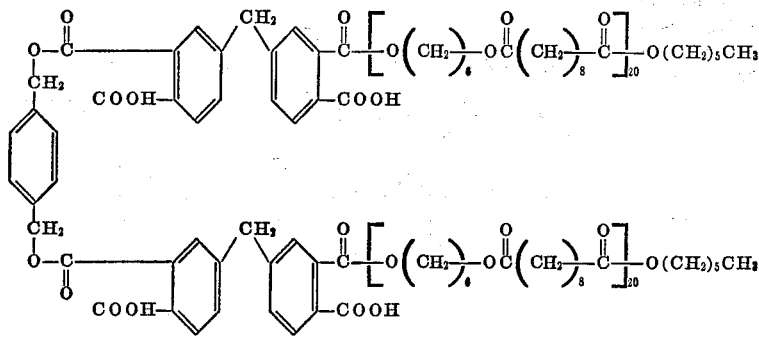

Example 6

(A) A mixture of pyromellitic dianhydride (2.18 parts), decamethylene glycol (1 part) and anhydrous ethylene glycol dimethyl ether (10 parts) was heated at 150° C. for two hours and then cooled to room temperature.

(B) Ethylene glycol (248 parts), adipic acid (584 parts), dodecyl alcohol (1.86 parts), xylene (50 parts) and p-toluene sulfonic acid (5 parts) were charged to a vessel. The mixture was heated at reflux and xylene distilled off until the temperature reached 150° C.

The mixture was then heated 10 hours at 150° C., with water being continuously removed. After cooling to 100° C., all of (A) and 1000 parts of ethylene glycol dimethyl ether were added and the mixture heated six hours at 100° C. Solvent was removed by heating the mixture at 100° C. and 20 mm. of pressure.

The resulting solid had the structure

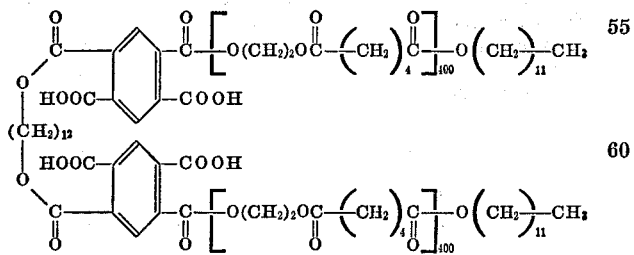

I claim:
1. A polymeric material of the formula

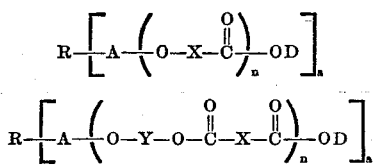

where
R is the residue from a polyhydroxy compound;
A is

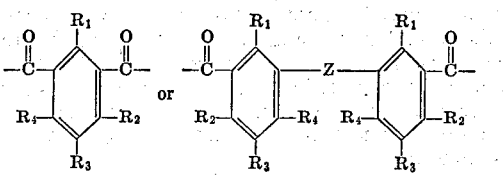

where
$R_1$, $R_2$, $R_3$ and $R_4$ is hydrogen or —COOH;
Z is

—$CH_2$—, —S—, —O—, or —$SO_2$—;

X is phenylene or an alkylene radical of 2 through 18 carbon atoms;
Y is an alkylene radical of 2 through 18 carbon atoms;
D is phenyl or a straight- or branched chain alkyl radical of 1 through 18 carbon atoms;
$a$ is a number 2 through 6;
and
$n$ is a number 10 through 500.

2. The polymeric material of claim 1 wherein R is

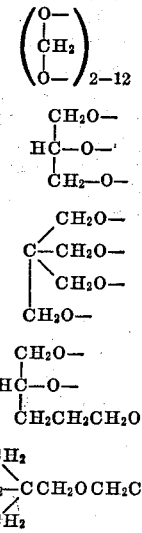

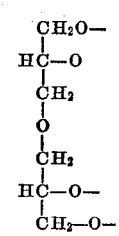

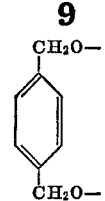
or
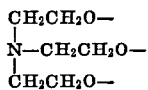
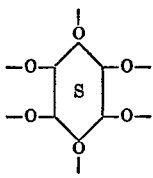
3. The polymeric material of claim 2 having the structure
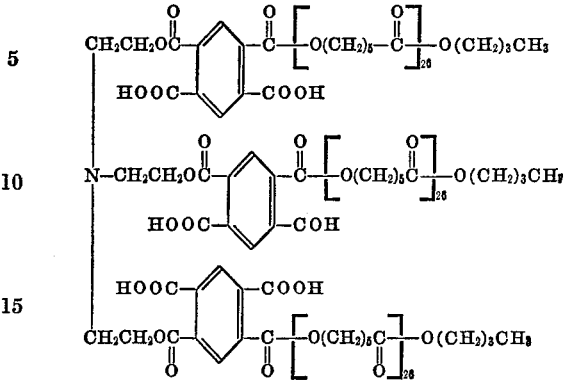
4. The polymeric material of claim 2 having the structure
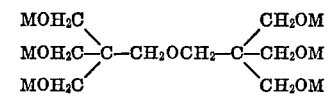
where M is
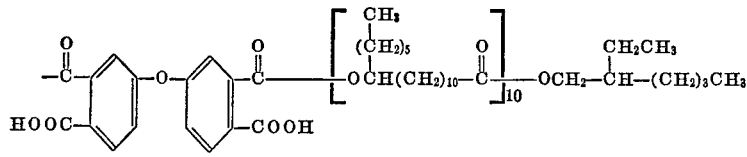
5. The polymeric material of claim 2 having the structure
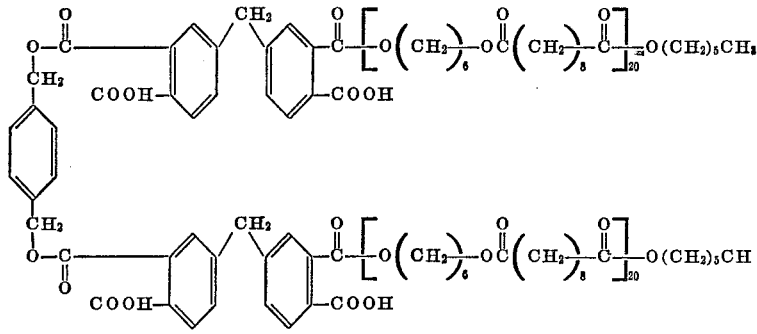
References Cited
UNITED STATES PATENTS
| | | | |
|---|---|---|---|
| 2,422,356 | 6/1947 | Lasher | 260—22 |
| 3,332,964 | 7/1967 | McCracken et al. | 260—346.3 |
| 3,459,733 | 8/1969 | Byrd et al. | 260—210 |
LEWIS GOTTS, Primary Examiner
D. G. RIVERS, Assistant Examiner
U.S. Cl. X.R.
260—22 R, 76, 77, 470, 473 S, 404, 475 P, 78.3 R, 835, 850, 858, 860; 106—266, 308 R; 117—161, 167